United States Patent [19]

Bäumler et al.

[11] Patent Number: 4,860,300

[45] Date of Patent: Aug. 22, 1989

[54] ELECTRODE FOR PULSED GAS LASERS

[75] Inventors: Jürgen Bäumler, Osterode; Manfred Zeh, Göttingen, both of Fed. Rep. of Germany

[73] Assignee: Lambda Physik Forschungs- und Entwicklungsgesellschaft MB, Gottingen, Fed. Rep. of Germany

[21] Appl. No.: 303,083

[22] Filed: Jan. 27, 1989

Related U.S. Application Data

[63] Continuation of Ser. No. 57,761, Jun. 3, 1987, abandoned.

[51] Int. Cl.$^4$ ................................................ H01S 3/22
[52] U.S. Cl. ........................................ 372/57; 372/87
[58] Field of Search ............................ 372/87, 57, 55

[56] References Cited

U.S. PATENT DOCUMENTS 4,345,293  8/1982  Hasse et al. ........................ 313/240
4,434,493  2/1984  Chaffee ................................. 372/87
4,498,183  2/1985  Levatter ............................... 372/57

OTHER PUBLICATIONS

West German Journal Article: *Laser und Optoelektronik*, titled: "Kommerzielle Excimerlaser", by H. Pummer, U. Sowada, P. Oesterlin, U. Rebhan und D. Basting, Lambda Physik, GmbH, 3400 Gottingen, Sonderdruck, vol. 17(2), 141–148 (1985).

*Primary Examiner*—James W. Davie
*Attorney, Agent, or Firm*—Irell & Manella

[57] ABSTRACT

An electrode for pulsed gas lasers consisting substantially of tungsten and copper has a long life. With such an electrode contaminations of the laser gas and of the windows are largely obviated, even in long-time operation. An electrode suitable also for fluoride-containing laser gases consists essentially of an alloy containing copper, aluminium and nickel.

3 Claims, No Drawings

ELECTRODE FOR PULSED GAS LASERS

This application is a continuation of application Ser. No. 057,761, filed June 3, 1987 now abandoned.

FIELD OF THE INVENTION

The invention relates to an electrode for pulsed gas lasers with stimulation of a gas between the electrodes by means of a gas discharge.

Lasers of this type are for example excimer lasers, $N_2$ lasers or $CO_2$ lasers. The construction and function of such lasers are known. In a laser resonator filled with gas at least two electrodes are arranged parallel to the optical axis. To the electrodes a voltage is applied and the laser gas between the electrodes stimulated by means of a gas discharge (plasma discharge).

The invention relates to the material from which such electrodes are made. In particular the invention relates to electrode material for excimer lasers.

BACKGROUND OF THE INVENTION

Excimer laser gas mixtures consist typically of 5 to 10% of a so-called active inert gas (e.g. krypton), 0.1 to 0.5% of a halogen donor such as $F_2$ and a light buffer gas, such as helium or neon, at a total pressure of 1.5 to 4 bar. Said gas is brought between two elongated parallel electrodes and exposed to said high-voltage discharge. To produce laser pulses of high energy, in the high-voltage discharge between the electrodes very high current densities of typically $10^3$ A/cm$^2$, power densities of $10^6$ W/cm$^3$ and electron temperatures in the region of 1 eV are necessary. In commercially usable excimer lasers to achieve an adequate breakdown field strength the electrode spacing must be relatively small, typically in the region of 2 to 3 cm. The electrodes are therefore subjected to great stress by the adjacent plasma.

The life of excimer laser gases is limited mainly by two processes. Firstly, even in well passivated systems chemical dark reactions take place between the halogen and the container walls which lead to consumption of the halogen and to contaminations. Secondly, a slight electrode erosion during the high-voltage discharge also leads to chemical reactions. The products resulting from the electrode erosion may occur both in the form of particles and in the form of volatile metal fluoride compound. In the former case this leads to dust deposits on the inner walls of the laser chamber and this is particularly undesirable in the region of the mirrors and windows; in the latter case due to the laser radiation itself a metal film can deposit photochemically on the inner side of the windows, said film also being extremely detrimental.

The material of the laser electrodes is thus not only decisive to the life of the electrodes, the form of which varies with the electrode erosion, but also decisive for the life of the laser gas and the laser optical system.

Corresponding considerations apply as well to other pulsed gas lasers, such as $N_2$ lasers or $CO_2$ lasers.

The electrode material must therefore be carefully selected as regards its chemical and physical stability and strength. In the prior art electrodes are usually employed of nickel and in some cases also brass. Also known are aluminium electrodes with a nickel coating (see the article by H. Pummer, U. Sowada, P. Oesterlin, U. Rebhan and D. Basting in the journal "Laser und optoelektronik" Vol. 17 (2), p. 141-148 (1985)).

The invention is based on the problem of preparing an electrode for pulsed gas lasers, in particular excimer lasers, which have optimum properties as regards the above requirements. The electrode is thus to have a long life and avoid contaminations of the laser gas and of the optical components, such as mirrors and windows, of the laser.

DETAILED DESCRIPTION AND PREFERRED EMBODIMENTS

According to a first solution of the invention this problem is solved in that the electrode consists at least partially of a material containing tungsten and copper.

In a preferred embodiment of the invention the material consists of 60 to 90%, preferably about 80% tungsten, with the remainder substantially copper.

In a particularly preferred embodiment the material consists of about 80% sintered tungsten powder into which about 20% copper is introduced.

The electrode described above of tungsten and copper is particularly well suited for all excimer laser gases apart from gas mixtures in which fluorides are contained.

For excimer laser gases containing fluorides the problem underlying the invention is solved by an electrode which consists at least partially of a material containing as essential components copper, aluminium and nickel.

In a preferred embodiment of this variant of the invention the material contains 60 to 90%, preferably about 80%, copper and the remainder as essential components at least aluminium and/or nickel.

In a particularly preferred further development of the invention the remainder mentioned above comprises apart from aluminium and nickel also at least iron as further component, the proportion of aluminium being greater than that of any other metal (apart from copper which forms the main component of the material).

Particularly suitable is an alloy consisting of about 80% copper, about 10% aluminium, about 5% nickel and about 4% iron. Such an alloy can also contain traces of other elements, such as zinc or manganese.

It has surprisingly been found that the material compositions according to the invention specified above and alloys for the electrodes substantially increase the life compared with known materials.

We claim:

1. In an excimer laser, having at least two electrodes exposed to an excimer gas mixture, the laser wherein:
    said electrodes each comprise substantially copper and tungsten; and
    said excimer gas mixture is substantially free of fluorides.

2. The laser of claim 1 wherein said electrodes each comprise 60-90% tungsten, with the remainder substantially copper.

3. The laser of claim 2 wherein said electrodes each comprise about 80% tungsten.

* * * * *